3,028,421
POLYHALOGENATED TETRAHYDRO-
PHTHALAMIC ACID
Russell M. Bimber, Painesville, Ohio, assignor to Diamond Alkali Company, Cleveland, Ohio, a corporation of Delaware
No Drawing. Filed Mar. 17, 1958, Ser. No. 721,685
4 Claims. (Cl. 260—514)

This invention relates to tetrahydrophthalmic acid derivatives represented by the structure:

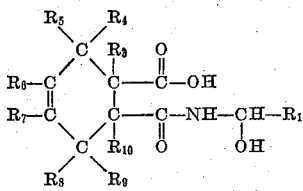

wherein $R_1$ is a halogen-substituted alkyl radical such as trichloromethyl, trichloroethyl, 1,1,2-trichloropropyl, tribromomethyl, 1-chloropropyl, and 1-chloroethyl; $R_3$, $R_4$, $R_5$, $R_6$, $R_7$, $R_8$, $R_9$ and $R_{10}$ are selected from the group consisting of hydrogen atoms, alkyl radicals, such as methyl, ethyl, propyl, butyl, octyl and the like, preferably lower alkyl radicals; aryl radicals, such as phenyl or naphthyl radicals; thienyl radicals, alkaryl radicals; such as tolyl or xylyl radicals; aralkyl radicals, such as benzyl or phenethyl radicals; halogen atoms, i.e., fluorine, chlorine, bromine, and iodine, chlorine being preferred, and substituted derivatives of the same, especially halogen-substituted derivatives, such as R's preferably containing no more than 30 carbon atoms, and to the method of preparing and using the foregoing.

More specifically, the present invention relates to novel tetrahydrophthalamic acid compounds represented by the structure:

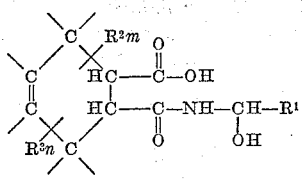

wherein $R^1$ is a halogen-substituted alkyl radical, e.g., trichloromethyl, 1,1,2-trichloropropyl, tribromomethyl, 1-chloropropyl, and 1-chloroethyl; $R^2$ is hydrogen, $R^3$ is alkyl, e.g., lower alkyl radicals such as methyl, ethyl, propyl, butyl radicals, or the like; $n$ equals 0 to 6; and $m$ equals 6–$n$.

Further exemplary of the above type compounds are those having the structure:

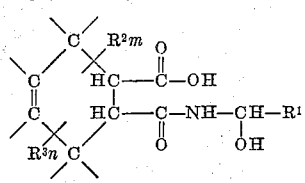

wherein $R^2$ is hydrogen; $R^3$ is alkyl, e.g. lower alkyl radical, such as methyl, ethyl, propyl, butyl radicals, or the like, $n$ equals 0 to 6; $m$ equals 6–$n$; $R^1$ is a halogen-substituted methyl radical, e.g.

X being halogen or hydrogen, at least one X being halogen, i.e., fluorine, chlorine, bromine, and iodine.

Specific preferred compounds of this invention are N-(trihalo-1-hydroxyloweralkyl)-X$n$ - tetrahydrophthalamic acids, X being a lower alkyl radical, e.g., methyl, ethyl, propyl, butyl, and the like, or a halogen atom, as previously defined; $n$ being a number from 0 to 2, inclusive. The following are illustrative of such compounds:

N - (2,2,2 - trichloro - 1 - hydroxyethyl) - tetrahydrophthalamic acid
N - (2,2,3 - trichloro - 1 - hydroxybutyl) - tetrahydrophthalamic acid
N - (2,2,2 - tribromo - 1 - hydroxyethyl) - tetrahydrophthalamic acid
N - (2,2,2 - trichloro - 1 - hydroxyethyl - 2 - methyltetrahydrophthalamic acid
N - (2,2,3 - tribromo - 1 - hydroxypropyl) - tetrahydrophthalamic acid
N - (2,2,2 - trichloro - 1 - hydroxyethyl) - 3(or 6) - chlorotetrahydrophthalamic acid Compounds of this invention may be prepared by chemically reacting a substituted tetrahydrophthalamic acid of the structure:

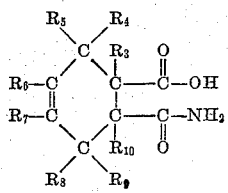

wherein $R_3$, $R_4$, $R_5$, $R_6$, $R_7$, $R_8$, $R_9$ and $R_{10}$ are selected from the group consisting of hydrogen atoms, alkyl radicals, such as methyl, ethyl, propyl, butyl, octyl and the like, preferably lower alkyl radicals; aryl radicals, such as phenyl radicals and naphthyl radicals; thienyl radicals, i.e., $C_4H_4S_1$; alkaryl radicals, such as tolyl or xylyl radicals; aralkyl radicals, such as benzyl and phenethyl radicals; and substituted derivatives of the same, especially halogen-substituted derivatives, e.g., fluorine, chlorine, bromine, and iodine; such R's preferably containing no more than 30 carbon atoms, with an alpha halo aldehyde, e.g., an alpha halo acetaldehyde.

The expression "alpha halo aldehyde" as used in the specification and claims is intended to refer broadly to a compound of the structure —RCHO— wherein R is an alpha-halogen-substituted alkyl radical, especially a halogen-substituted lower alkyl radical, as previously defined. Exemplary alpha halo aldehydes are 2,2,3-trichloropropionaldehyde; 2,2,3-tribromopropionaldehyde; 2,2,2-trichlorobutyraldehyde; 2,2,3,3 - tetrachlorobutyraldehyde; and 2,3-difluorobutyraldehyde; specifically preferred alpha halo aldehydes being alpha halo acetaldehydes, such as chloral, 2,2-dichloroacetaldehyde, 2,2,2-tribromoacetaldehyde, 2,2-dichloro-2-bromoacetaldehyde. It is also intended that the above alpha halo aldehydes and specifically the alpha halo acetaldehydes should include their respective hydrates, e.g., chloral hydrate, the hydrate of 2,2,3-trichlorobutyraldehyde, and the hydrate of 2,2-dichloroacetaldehyde.

More specifically, novel compounds of this invention may be prepared by chemically reacting a compound represented by the structure:

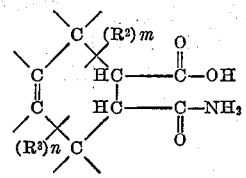

wherein $R^2$ is hydrogen, $R^3$ is alkyl, e.g., lower alkyl radical, such as methyl, ethyl, propyl, butyl radicals, or the like; $n$ equals 0–6; and $m$ equals 6–$n$; with an alpha halo aldehyde, e.g., an alpha halo acetaldehyde, as previously defined.

Still more specifically, novel compounds of this invention may be prepared by chemically reacting a lower alkyl substituted tetrahydrophthalamic acid of the structure:

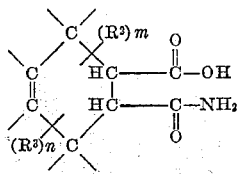

wherein $R^2$ is hydrogen, $R^3$ is alkyl, e.g., lower alkyl radical, such as methyl, ethyl, propyl, butyl radicals, or the like; $n=0-6$; $m=6-n$, with a compound represented by the structure:

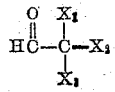

wherein $X_1$, $X_2$, and $X_3$ are selected from the group consisting of hydrogen atoms, and halogen atoms, as previously defined, at least one X being halogen, e.g., X=chlorine, X=bromine.

Specific preferred N-(trihalo-1-hydroxy lower alkyl)-X$n$-tetrahydrophthalamic acids of this invention may be prepared by chemically reacting X$n$-tetrahydrophthalamic acid with an alpha halo aldehyde of the structure:

wherein $R_1$ is a halogen-substituted methyl group; X being a lower alkyl radical, e.g., methyl, ethyl, propyl, butyl and the like, or a halogen atom as previously defined; $n$ being a number from 0 to 2, inclusive.

Typically, the above reactions are advantageously carried out below the decomposition temperature of the reactants, e.g., at reflux temperature or less, 150° C. generally being a practicable upper temperature limit in most instances. In general, it is preferred to employ substantially stoichiometric ratios of the reactants. However, considerable departure from these ratios can be tolerated in many instances without serious detriments to either yield or quality of product. The reaction chemical combination is preferably carried out until complete, e.g., reaction in the range of 1 to 5 hours. In certain instances, the reaction may be more easily effected by bringing together the two starting materials in the presence of a solvent such as water, or an organic solvent such as benzene, chloroform, heptane, ether, petroleum ether, hexane, carbon tetrachloride or the like.

Specific reactions falling within the scope of this invention are indicated in Table I in which any compound in column 1, i.e., the tetrahydrophthalamic acids, may be reacted with a compound in column 2, i.e., alpha halo aldehyde.

TABLE I

*Reactants*

| Tetrahydrophthalamic acid Column 1 | Alpha Halo Aldehyde, Column 2 |
|---|---|
| 3-methyl-tetrahydrophthalamic acid | Cl$_3$C—CHO |
| 4-chloro-tetrahydrophthalamic acid | Cl$_2$CH—CHO |
| tetrahydrophthalamic acid | CH$_3$CHCl—CCl$_2$—CHO |
| 3,4-diethyl-tetrahydrophthalamic acid | CH$_2$Cl—CHCl—CHO |

Specifically exemplary of the above preparations is that of N-(2,2,2-trichloro-1-hydroxyethyl)-tetrahydrophthalamic acid which comprises chemically combining tetrahydrophthalamic acid and chloral. The reaction is typically carried out at a temperature above 0° C. up to the decomposition temperature of chloral, e.g., at reflux temperature preferably in a range between 50°–110° C. Desirably, stoichiometric quantities of reactants are combined; however, in certain instances, addition of a slight excess of chloral is desirable. Preferably, the reaction is carried to completion, e.g., for a time within the range of from about 1 to 5 hours. Various solvents, previously disclosed, may be employed to facilitate chemical combination.

It will be understood that the reaction may be carried out, when desirable, by employing the desired tetrahydrophthalic anhydride as the starting material, the anhydride being converted to the tetrahydrophthalamic acid which in turn reacts with the chloral. Various reaction conditions and solvents may be employed as previously disclosed.

The compounds of this invention are useful in the field of pharmaceuticals, chemical intermediates, and also show biological activity such as the control of plant growth, e.g., pre- and post-emergent herbicidal activity, the control of microorganism growth, e.g., the protection of tomato foliage against blight fungi. While compounds of this invention may be employed in a variety of applications, biologically or otherwise, when employed as biologically active materials it will be understood, of course, that such compounds may be utilized in diverse formulations, both liquid and solid, including finely-divided powders and granular materials, as well as liquid, such as solutions, concentrates, emulsifiable concentrates, slurries, and the like, depending upon the application intended and the formulation media desired.

Thus, it will be appreciated that compounds of this invention may be employed to form biologically active substances containing such compounds as the essential active ingredients thereof which compositions may also include finely-divided dry or liquid diluents, extenders, fillers, conditioners, including various clays, diatomaceous earth, talc, spent catalyst, alumina-silica materials, and incorporating liquids, solvents, diluents, etc., typically water and various organic liquids such as kerosene, benzene, toluene, carbon disulfide, carbon tetrachloride, chloroform, ethyl acetate, toluene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Suitable surface active agents are set out for example in a detailed list in an article by McCutcheon in "Soap and Chemical Specialities," vol. 31, No. 7–10 (1955).

The term "carrier" as employed in the specification and claims is intended to refer broadly to the materials constituting a major proportion of a biologically active or other formulation, and hence includes finely-divided materials, both liquids and solids as aforementioned conventionally used in such applications.

The compounds of this invention may also be used in combination with other known biologically active materials such as organic phosphates, chlorinated hydrocarbons, and various pre- and post-emergent herbicides.

In order that those skilled in the art may more completely understand the present invention and the preferred methods by which the same may be carried into effect, the following specific examples are offered.

EXAMPLE I

*Preparation of N-(2,2,2-Trichloro-1-Hydroxyethyl)-Tetrahydrophthalamic Acid*

94.0 g. (0.6 mol) tetrahydrophthalic anhydride is stirred with 135.0 ml. of 28% NH$_3$ in water solution. The resulting solution, at 70° C., is then cooled to 10° C. and 90 ml. of 37% HCl is added slowly with cooling. The acidic solution is filtered and cooled to crystallize the tetrahydrophthalamic acid.

55.8 g. of this tetrahydrophthalamic acid is then refluxed with 150 ml. of chloral for about 3 hours after which the mixture is allowed to cool and the excess chloral filtered off. The solid product is triturated twice with petroleum ether and recrystallized from methanol and ethanol. A further purification step is carried out comprising boiling the product for about 5 minutes, filtering hot, and rinsing the undissolved powder with three 20 ml. portions of methanol resulting in the desired $C_{10}H_{12}Cl_3NO_4$, M.P. 159–160.5° C., indicated by the following elemental analytical data:

| Element | Actual, percent by Wt. | Calculated, percent by Wt. |
| --- | --- | --- |
| C | 38.06 | 37.95 |
| H | 3.83 | 3.82 |
| Cl | 33.7 | 33.6 |

The above product is less than 5% soluble in water, acetone, cyclohexanone, and xylene, and greater than 5% soluble in benzene, chloroform, and ethyl acetate.

EXAMPLE II

To demonstrate insecticidal activity, male German cockroaches, *Blatella Germanica*, 8 to 9 weeks old are anesthetized with carbon dioxide to facilitate handling and then dipped in a test formulation (2000 p.p.m. product of Example I, 5% acetone, 0.01% Triton X–155, balance water) for 10 seconds, removed, freed of excess liquid, and caged. Two lots of 10 insects each are exposed to this formulation and mortality observations are recorded after 3 days. Using the product of Example I at the above concentrations, significant mortality for the cockroaches is observed.

EXAMPLE III

Further insecticidal activity is shown against the bean aphid, *Aphis fabae*, which is cultured on nasturtium plants. Nasturtium plants are infested with approximately 100 aphids at the time of treatment. The test plants are treated by pouring a formulation (2000 p.p.m. product of Example I, 5% acetone, 0.01% Triton X-155, balance water) on the soil in which the plants are growing at a rate equivalent to 64 pounds per acre. Aphid mortality of 60% is observed 24 hours after treatment.

EXAMPLE IV

Fungicidal activity is evaluated through a tomato foliage disease test measuring the ability of the test compound to protect tomato foliage against infection by the early blight fungus, *Alternaria solani*. Tomato plants 5 to 7" high of the variety Bonny Best are employed. The plants are sprayed with 100 ml. of test formulation (2000 p.p.m. and 400 p.p.m. product of Example I, 5% acetone, 0.01% Triton X-155, balance water) at 40 pounds air pressure while being rotated on a turntable in a spray chamber. After the spray deposit is dry, the treated plants, and comparable untreated controls, are sprayed with about 20 ml. spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants show 36% and 21% diease control at the 2000 and 400 p.p.m. concentrations, respectively.

EXAMPLE V

Further fungicidal utility is demonstrated by the ability of N-(2,2,2-tricloro-1-hydroxyethyl)-tetrahydrophthalamic acid to protect tomato plants against the late blight fungus, *Phytophthora infestans*. The method employs tomato plants 5 to 7" high of the variety Bonny Best. 100 ml. of a test formulation (2000 p.p.m. product of Example I, 5% acetone, 0.01% Triton X-155, balance water) are sprayed on the plants at 40 pounds air pressure while the plants are being rotated on a turntable in a spray chamber. After the spray deposit is dry, the treated plants and comparable untreated controls are sprayed with about 20 ml. of spore suspension containing approximately 150,000 sporangi of *P. infestans* per ml. The plants are held in a 100% humid atmosphere for 24 hours at 60° F. to permit spore germination and infection. After 2 to 4 days, lesion counts are made on the three uppermost fully expanded leaves. Comparing the number of lesions on the test plants and control plants shows disease control of 28% at the above concentration.

EXAMPLE VI

A further fungicide test uses bean, variety Tendergreen, and tomato, variety Bonny Best, plants growing in 4" pots which are treated by pouring a test formulation (2000 p.p.m. product of Example I, 5% acetone, 0.01% Triton X-155, balance water) into the pots at a rate equivalent to 128 pounds per acre (102 mg. per pot). The tomato plants are 3 to 4" tall and the trifoliant leaves just starting to unfold at the time of treatment. The bean plants are exposed to powdery mildew continuously after seedling emergence so that at the time of treatment infection has occurred. The tomato plants are infected with the early blight fungus referred to in Example IV. Observation of the tomato plants after 4 days indicates 41% disease control while observation after 14 days on the bean plants indicates very slight disease control of the powdery mildew.

EXAMPLE VII

To evaluate the effect of the product of Example I upon the germination of seeds in soil, a mixture of seed of six crop plants is broadcast in 8" x 8" x 2" metal cake pans filled to within one half inch of the top with composted greenhouse soil. The seed is uniformly covered with about one quarter inch soil and watered. After 24 hours, 80 ml. of an aqueous test formulation containing 320 mg. of the product of Example I is sprayed at 10 pounds air pressure uniformly over the surface of pans. This is equivalent to 64 pounds per acre. The seed mixture contains representative seeds of three broadleafs: turnip, flax, and alfalfa, and three grasses: wheat, millet, and rye grass. Two weeks after treatment, records are taken on seedling stands as compared to the controls. Using this procedure, results show 100% stand for the broadleaf and 75% stand for the grasses, thus indicating selective herbicidal activity.

It is to be understood that although the invention has been described with specific reference to particular embodiments thereof, it is not to be so limited since changes and alterations therein may be made which are within the full intended scope of this invention as defined by the appended claims.

What is claimed is:
1. Compounds represented by the structure:

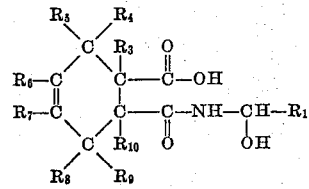

wherein $R_1$ is a halogen-substituted lower alkyl radical; and $R_3$, $R_4$, $R_5$, $R_6$, $R_7$, $R_8$, $R_9$ and $R_{10}$ are selected from the group consisting of hydrogen atoms, lower alkyl radicals and halogen atoms.

2. Compounds represented by the structure:

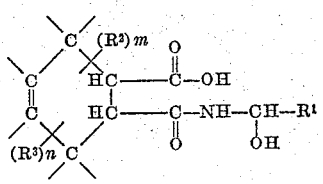

wherein $R^1$ is a halogen-substituted lower alkyl radical, $R^2$ is hydrogen, $R^3$ is lower alkyl, $n=0-6$, and $m=6-n$.

3. Compounds represented by the structure:

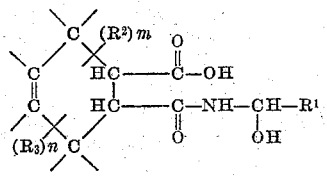

wherein $R^2$ is hydrogen, $R^3$ is lower alkyl, $R^1$ is a halogen-substituted methyl group, $n=0-6$, and $m=6-n$.

4. N-(2,2,2-trichloro-1-hydroxyethyl)-tetrahydrophthalamic acid.

References Cited in the file of this patent
UNITED STATES PATENTS

| | | |
|---|---|---|
| 2,695,225 | Witman | Nov. 23, 1954 |
| 2,695,839 | Kenney et al. | Nov. 30, 1954 |
| 2,774,787 | Geschicker | Dec. 18, 1956 |
| 2,844,505 | Miller et al. | July 22, 1958 |
| 2,847,460 | Trapp et al. | Aug. 12, 1958 |
| 2,850,425 | Gaertner | Sept. 2, 1958 |

OTHER REFERENCES

Vavon et al.: "Bull. Soc. Chem.," France, vol. 45 (1929), pages 298–9. (Copies in Scientific Library.)

Degering et al.: "An Outline of Organic Nitrogen Compounds" (1945), page 426. (Copies in Scientific Library.)